United States Patent Office 3,146,595
Patented Sept. 1, 1964

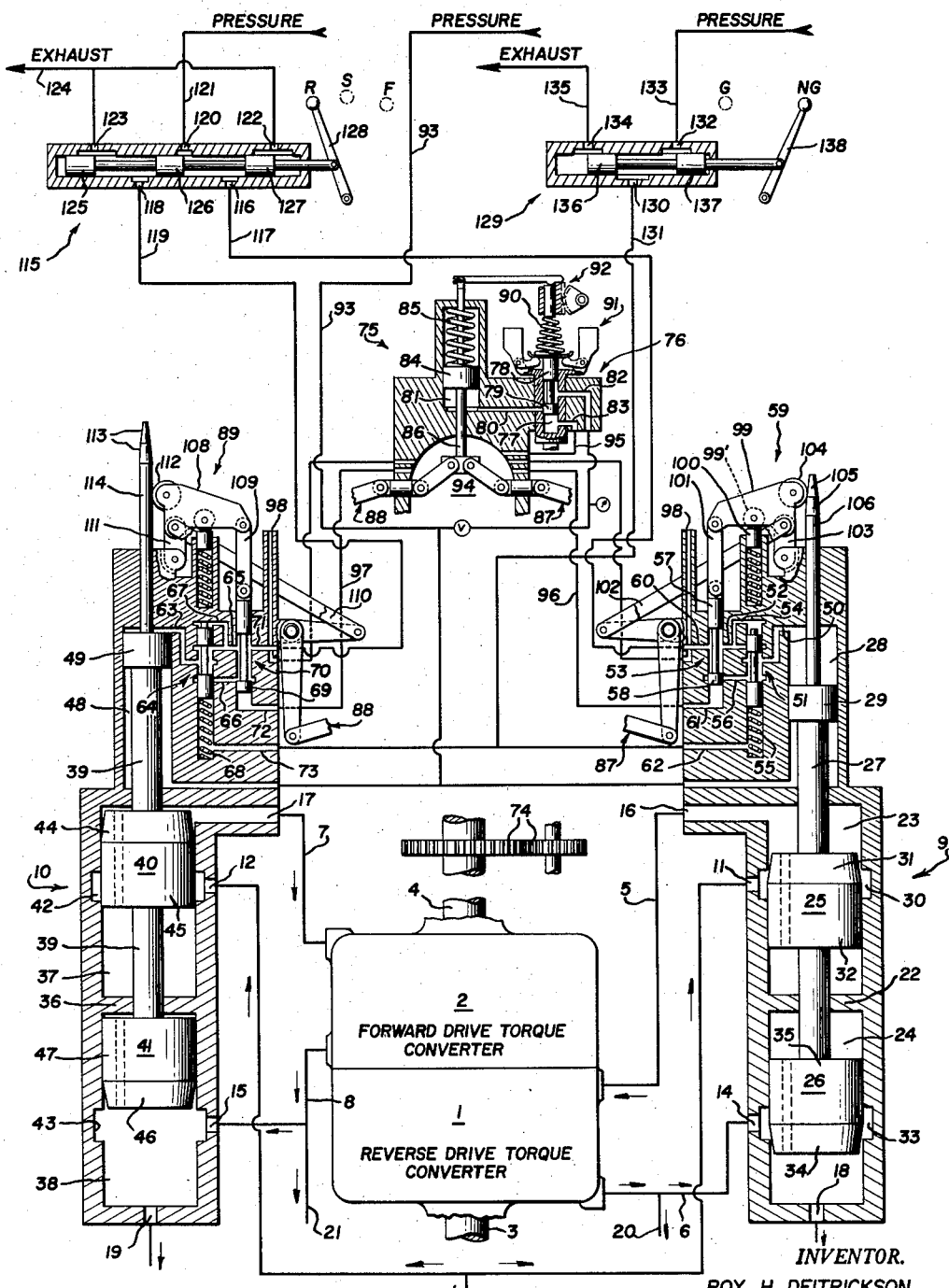

3,146,595
CONTROL SYSTEM FOR FLUID COUPLING
Roy H. Deitrickson, Allison Park, Pa., assignor, by mesne assignments, to Armco Steel Corporation, Middletown, Ohio, a corporation of Ohio
Filed Oct. 28, 1959, Ser. No. 849,363
6 Claims. (Cl. 60—54)

This invention relates to hydraulic control systems and more particularly to a control system for use in conjunction with devices, such as torque converters, for example, wherein a container is supplied with a regulated amount of fluid and is relatively rapidly filled and emptied.

An object of the invention is to provide a novel system in which a container is not only rapidly filled and emptied when desired but is also supplied with an accurately controlled, automatically varying amount of fluid.

Another object is to devise an improved system for filling and dumping a hydraulic torque converter and for accurately regulating the quantity of fluid in the converter in response to a variable condition, such as speed.

A further object is to provide a system for driving a rotary shaft selectively in either direction via a pair of alternatively operated hydraulic torque converters, said system comprising novel means for effecting alternate operation of the converters.

In order that the manner in which these and other objects are attained, in accordance with the invention, can be understood in detail, reference is had to the accompanying drawing, which forms a part of this specification, and wherein the single figure illustrates one embodiment of the invention applied to a forward and reverse drive for ships and like applications.

Referring now to the drawing in detail, it will be seen that this embodiment of the invention involves a pair of conventional hydraulic torque converters, indicated at 1 and 2, an engine or driving shaft 3 being connected to the input of both converters, the output of both converters being connected to the shaft 4, such as a ship propeller shaft, to be driven selectively in either direction, the converters 1 and 2 being so assembled that each converter drives shaft 4 in a different direction, though shaft 3 is of course driven in only one direction by the engine shaft. Converters 1 and 2 are of conventional internal construction, involving the usual bladed pump, turbine and stator elements. As is well known, the effectiveness of the converters 1 and 2 depends upon the amount of hydraulic fluid in the working circuit and the operation of the torque converters is accordingly controlled by varying the amount of fluid in the working circuit.

Converter 1 is provided with a fluid supply line 5 and a fluid exhaust line 6. Converter 2 is similarly provided with supply line 7 and exhaust line 8. The lines 5 and 6 of converter 1 are controlled by a 4-way piston valve 9, and lines 7 and 8 by a 4-way piston valve 10, valves 9 and 10 being identical. Valves 9 and 10 have inlets 11 and 12, respectively, connected in parallel to line 13, via which hydraulic fluid is supplied under pressure from a supply pump, not shown. Valves 9 and 10 have a second set of inlets 14 and 15, respectively, inlet 14 of valve 9 being connected to the exhaust line 6 of converter 1, while inlet 15 of valve 10 is connected to exhaust line 8 of converter 2. Outlets 16 and 17 of valves 9 and 10, respectively, are connected respectively to supply line 5 of converter 1 and supply line 7 of converter 2. A second set of outlets 18 and 19 of valves 9 and 10, respectively, are connected in parallel to the usual fluid sump, not shown, via a filter and cooler, not shown, the hydraulic circuit including the supply pump, sump, filter and cooler being of any suitable conventional configuration.

Between converter 1 and valve 9, exhaust line 6 is connected by a branch 20 to a conventional back pressure regulator, not shown, which automatically controls the back pressure on the fluid in the converter as the fluid is circulated. Similarly, exhaust line 8 is connected by a branch 21 to a conventional back pressure regulator, not shown.

The housing of valve 9 is provided with an intermediate transverse partition 22 dividing the interior thereof into an upper cylindrical chamber 23, with which ports 11 and 16 communicate, and a lower cylindrical chamber 24, with which ports 14 and 18 communicate. A movable cylindrical valve member 25 is disposed for reciprocation in chamber 23, and a similar cylindrical valve member 26 is disposed for reciprocation in chamber 24, the two movable valve elements being fixed to the same actuating rod 27. Rod 27 extends slidably through a central opening in partition 22 and also through the upper end wall of chamber 23, projecting into a hydraulic cylinder 28 and being there provided with a piston 29.

Rather than entering directly into chamber 23, inlet port 11 opens into an annular, transversely extending, inwardly opening groove 30. The upper end portion 31 of valve member 25 tapers inwardly, the length of the tapered portion 31 being slightly greater than the axial dimension of groove 30. The cylindrical main body portion 32 of valve member 25 is of sufficient length to completely close groove 30, preventing fluid from supply line 13 from entering chamber 23, when the valve member is in its extreme upper position.

In lower chamber 24, inlet port 14 similarly enters an annular, transversely extending, inwardly opening groove 33, the axial dimension of which is materially less than the length of inwardly tapered lower end portion 34 of valve member 26. The length of cylindrical main body portion 35 of member 26 is such that, when that member occupies its extreme lower position, portion 35 completely closes groove 33 and so prevents entry of fluid from exhaust line 6 into chamber 24.

It is thus evident that, when the combination of valve members 25 and 26 and valve rod 27 is in its uppermost position, valve member 25 is effective to prevent fluid from being supplied from line 13 to the working chamber of converter 1, but valve member 26 occupies a position such that a free flow of fluid from exhaust line 6 into chamber 24 and out the outlet port 18 is allowed. Hence, when the movable parts of valve 9 are in the position just mentioned, rotation of input shaft 3 causes converter 1 to be dumped, as a result of normal operation of the working elements. On the other hand, when the combination of valve members 25 and 26 and valve rod 27 is in its extreme lower position, flow of fluid from the converter via exhaust line 6 is prevented, since member 26 completely closes groove 33, and fluid from supply line 13 is free to enter chamber 23 and pass, via port 16 and supply line 5, to converter 1. Hence, such position of the movable valve parts allows converter 1 to be quickly filled by the action of the supply pump to which line 13 is connected.

When the combination of movable valve members 25 and 26 and valve rod 27 is in its intermediate position, as shown, the tapered portions 31 and 34 of the movable valve members leave grooves 30 and 33 partially open, so that fluid can pass from supply line 13 into chamber 23 and thence to the working chamber of converter 1, and fluid can also pass from the working chamber of converter 1 via exhaust line 6, valve chamber 24 and outlet port 18. Thus, when the movable valve assembly is in such an intermediate position, fluid circulates through the working chamber of the converter at a rate dependent upon the particular position of the movable valve parts.

Since valve members 25, 26 are provided with axially tapered end portions, and since axial movement of the members 25, 26 is effective, in the intermediate range of movement of the valve members, to progressively open and close grooves 30 and 33, it is evident that small intermediate movements of the valve members 25, 26 are effective to cause small changes in the rate of circulation of fluid through the working chamber of converter 1. Thus, though valve 9 has an on-off action in the extreme positions of the movable parts, it serves to accurately meter the flow of fluid when the movable valve members are in their intermediate range of movement.

Valve 10 is associated with torque converter 2 and is identical to valve 9 in construction. Thus, valve 10 includes a transverse partition 36 dividing the interior of the valve casing into an upper cylindrical chamber 37, with which ports 12 and 17 communicate, and a lower cylindrical chamber 38, with which ports 15 and 19 communicate. Reciprocable valve rod 39 extends through an opening in partition 36 and carries a movable cylindrical valve member 40 in chamber 37 and a movable cylindrical valve member 41 in chamber 38. Port 12 opens into a transversely extending, inwardly opening, annular groove 42. Port 17 opens into a like transversely extending, inwardly opening, annular groove 43.

Valve member 40 has an inwardly tapered tip portion 44 and a plane cylindrical portion 45, the length of tip portion 44 being materially greater than the axial dimension of groove 42 and the length of portion 45 being such that, as illustrated, groove 42, and hence port 12, are completely closed when member 40 is in its extreme upper position. Valve member 41 is also provided with an inwardly tapered tip portion 46 and a plane cylindrical portion 47, tip 46 being longer than the axial dimension of groove 43 and portion 47 being of such length as to completely close groove 43 when member 41 is in its extreme lower position.

Valve rod 39 projects through the upper end wall of the valve casing into a hydraulic cylinder 48 and is there provided with a piston 49.

It will be apparent that valve 10 functions in the same manner as does valve 9. When valve members 40, 41 are in their extreme upper positions, fluid cannot be supplied from line 13 to torque converter 2, since groove 42 and port 12 are fully closed, but fluid can pass from the working chamber of converter 2, via line 8, port 15, valve chamber 38 and port 19, to the sump, so that rotation of shaft 3 will cause converter 2 to be dumped. Actuation of valve elements 40, 41 to the opposite extreme position allows converter 2 to be filled by the supply pump, since groove 42 and ports 12 and 17 are then open, but prevents fluid from passing from the working chamber of converter 2 to the sump, since port 15 and groove 43 are then closed. In their intermediate ranges of movement, valve members 40 and 41 are effective to accurately regulate the rate of circulation of fluid through converter 2, due to the cooperation between tapered portions 44 and 46 and grooves 42 and 43, respectively.

Above piston 29, the interior of cylinder 28 communicates with a duct 50 connected to the mid-portion of the elongated chamber of a pilot valve 51. Pilot valve 51 includes an upper and a lower movable valve member, the two movable valve members being connected together by a rigid stem of reduced diameter so as to move simultaneously. A duct 52 leads from a servo valve 53 to that upper portion of the chamber of valve 51 which defines the working space for the upper valve member, a branch 54 of duct 52 being in communication with the corresponding end of the chamber so that fluid can be supplied, via servo valve 53, to bias the movable members of valve 51 in one direction (downwardly, as viewed). The movable members of the pilot valve are biased in the opposite direction by a spring 55. A duct 56 leads from the chamber of valve 51 to servo valve 53. As will be explained hereinafter, pilot valve 51 is operative selectively to (1) allow the supply of fluid under pressure to the interior of cylinder 28 above piston 29, or the exhaust of fluid from the interior of cylinder 28, via duct 60, servo valve 53 and ducts 52 and 50, and (2) allow the controlled discharge of fluid from the interior of cylinder 28 above piston 29 via ducts 50 and 56 and servo valve 53.

Servo valve 53 includes a vertical bore, open at the top, in which is slidably disposed an elongated upper movable portion 57 and a shorter lower movable valve member 58, the two movable valve members being connected together rigidly by an intermediate rigid stem of smaller diameter, so that the two movable valve members move simultaneously. Member 57 projects upwardly from the bore of the valve and is connected to servo actuating mechanism 59 later described. A duct 60 communicates with the bore or chamber of valve 53 at a point approximately aligned with duct 52. A duct 61 communicates with the lower end of the bore or chamber of valve 53.

The end of the chamber of pilot valve 51 which contains spring 55 communicates with a pressure supply duct 62.

Above piston 49, the interior of cylinder 48 communicates with a duct 63 connected to a pilot valve 64 identical to pilot valve 51 and controlling a duct 65 and a duct 66. Duct 65 has a branch 67 communicating with the upper end of the chamber of valve 64 and the fluid pressure bias so afforded on the movable members of the valve is opposed by an upwardly acting spring 68.

Duct 66 is controlled by the movable member 69 of a servo valve 70 which is identical to valve 53. A duct 71 is connected to the chamber or bore of valve 70 to communicate with duct 65. A duct 72 is connected to the lower end of the chamber or bore of valve 70, below movable member 69, for controlled communication with duct 66.

The lower end of the chamber of pilot valve 64, containing spring 68, communicates with a pressure supply duct 73.

Actuated from the driven shaft 4 via gears 74 is a centrifugal governor, indicated generally at 75, of the hydro-mechanical type, comprising a centrifugally operated control valve 76. Valve 76 includes a bore 77, open at one end, into which extends a reciprocatory member 78 carrying at its tip the movable member 79 of the valve. A duct 80, connected to the lower (as viewed) end of a cylinder 81, opens into bore 77 of valve 76 at approximately the mid-point of the bore. Toward one end, bore 77 communicates with a pressure supply duct 82 and, toward the other end, the bore communicates with an exhaust duct 83.

Disposed for reciprocation in cylinder 81 is a piston 84, the lower face (as viewed) of the piston being exposed to pressure fluid supplied via valve 76 and duct 80, a spring 85 being arranged within the cylinder to bias the piston downwardly. The piston 84 is mounted on a piston rod 86 connected by linkages 87 and 88 to the servo actuators 59 and 89 for servo valves 51 and 70, respectively.

Member 78, and therefore movable valve member 79, of valve 76 are biased downwardly by a spring 90. A conventional centrifugal actuating device 91 is arranged to increasingly oppose spring 90 as the speed of shaft 4 increases. Hence, a predetermined increase in speed from a given value will cause valve member 79 to move upwardly, placing ducts 80 and 83 in communication, so that fluid is exhausted from below piston 84, while a predetermined decrease in speed will cause valve member 79 to move downwardly, placing ducts 80 and 82 in communication, so that fluid under pressure is supplied to cylinder 81 below piston 84. The action of centrifugal actuating device 91 is opposed conventionally by a speed droop means 92 to reduce "hunting."

Below pistons 29 and 49, respectively, cylinders 28 and 48 both communicate with a common pressure fluid supply line 93, to which line the pressure supply duct 82 of valve 76 is also connected.

Governor 75 includes a chamber 94 which is at relatively low pressure, advantageously at or about atmospheric pressure. Duct 83 of valve 76 is connected to chamber 94 via conduit 95. Similarly, duct 61, from servo valve 53, is connected to chamber 94 via conduit 96, while duct 72 of servo valve 70 is connected to chamber 94 via conduit 97. Chamber 94 exhausts to atmosphere via overflow pipes 98.

Servo actuator 59 comprises a generally horizontal lever arm 99, supported intermediate its ends by a floating pivot provided by a roller 99' carried by the lever and engaging the end of a spring biased plunger 100. At one end, lever arm 99 is pivoted to one end of a link 101, the other end of link 101 being pivoted to the projecting end of reciprocatory member 57 of servo valve 53. At its other end, lever arm 99 is pivoted to link 102 of the actuating linkage 87 and also to a stabilizing link 103 pivoted to a fixed part of the apparatus, as shown. Near its pivotal connection to link 102, lever arm 99 carries a cam roller 104 held in contact with the two stage conical cam surface 105 at the tip of an upwardly directed extension 106 carried by piston 29.

Recognizing that plunger 100 and roller 99' provide the fulcrum point for lever arm 99, it will be understood that a downward movement of governor piston 84, imparting motion to lever arm 99 through actuating linkage 87, causes an upward movement of the end of arm 99 connected to link 101, and so elevates member 58 of servo valve 53. Conversely, upward movement of governor piston 84 results in a downward actuation of servo valve member 58.

The effect of the governor, imparted via linkage 87, on lever arm 99 is opposed by the action of cam roller 104 and cam surfaces 105, it being understood that the latter shift as the mechanism operates. The cam surfaces 105 and roller 104 are so dimensioned and located as to assure that the amount of motion imparted to servo valve member 58 when the governor piston 84 moves is related in a predetermined fashion to the extent of movement of the governor piston.

Servo actuator 89 is identical to actuator 59, comprising lever arm 108 pivotally connected at one end to movable member 69 of servo valve 70 by link 109 and at the other end to link 110 of actuating linkage 88 and also to stabilizing link 111. A cam roller 112 is carried by arm 108 for engagement with cam surfaces 113 on an extension 114 carried by piston 49.

Since control of the two torque converters 1, 2 is alternate, each being used to drive shaft 4 in a different direction, so that one converter is active to supply power when the other is inactive, the control means hereinbefore described must be subject to an appropriate master control to select the desired rotation of shaft 4. To this end, the invention employs a manually actuated master valve 115 having a port 116 connected via conduit 117 to conduct 60, and a port 118 connected via conduit 119 to duct 71. A port 120 of valve 115 is connected to a source of fluid under presure via conduit 121. Ports 122 and 123 are both connected to conduit 124 and thence to exhaust. Valve 115 includes three spaced, rigidly interconnected, movable valve members 125, 126, 127 connected for reception by hand lever 128, as shown. The axial lengths of valve members 125-127, the axial spacing between said members, and the disposition of ports 116, 118, 120, 122 and 123 are such that when the lever 128 is pivoted to its extreme left position, as shown, pressure fluid from conduit 121 is supplied to duct 60 and duct 71 is connected to exhaust line 124. On the other hand, if lever 128 is pivoted to its extreme right hand position, pressure fluid from conduit 121 is supplied to duct 71 and duct 60 is connected to exhaust line 124. When lever 128 is centered between the two positions just mentioned, both ducts 60 and 71 are simultaneously connected to exhaust line 124.

Governor 75 and its associated servo actuators 59 and 89 are useful only when it is desired to maintain a predetermined operating condition of one of the torque converters and means is accordingly provided for rendering the governor and servo means selectively active and inactive. This means includes a manual governor selector valve 129 having a port 130 connected, via conduit 131, to both duct 62 and duct 73. Valve 129 also is provided with a port 132, connected via conduit 133 to a source of fluid under pressure, and a port 134, connected via conduit 135 to exhaust. Two spaced movable valve members 136, 137 are provided, the valve members being rigidly interconnected for simultaneous reciprocatory movement by pivoted hand lever 138. The arrangement is such that, when lever 138 is in its extreme right hand position, as shown, the movable valve elements are in positions placing conduit 131 in communication with the pressure conduit 133, exhaust port 134 being blocked. On the other hand, when lever 138 is in its extreme left hand position, port 132 is blocked and conduit 131 is placed in communication with exhaust line 135.

*Operation*

Operation of this embodiment of the invention will be understood from a consideration of the effect of the various control elements when in the positions shown. As illustrated, valve 115 is in position to cause torque converter 1 to drive shaft 4 in a given direction assumed, for illustration, to be the "reverse" direction in a ship drive. Accordingly duct 60 is in communication with pressure fluid supply line 121, while duct 71 is connected to exhaust line 124. Conduit 93 supplies pressure fluid to cylinders 28 and 48 below pistons 29 and 49. Because of the difference in areas of the two faces of piston 29, the effective pressure above piston 29 predominates, it being assumed that the pressures supplied via lines 93 and 121 are approximately the same. Hence, piston 29 and members 25, 26 of valve 9 are moved downwardly, causing torque converter 1 to be rapidly filled. On the other hand, since the portion of cylinder 48 above piston 49 is connected to exhaust, the pressure fluid supplied below piston 49 by line 93 causes that piston and members 45 and 47 of valve 10 to move to their extreme upper positions, causing rapid dumping of torque converter 2.

At this time, the movable members 136 and 137 of valve 129 are in positions causing pressure fluid to be supplied from conduit 133 to the ends of both pilot valves 51 and 64 which contain springs 55 and 68, respectively. The movable members of the pilot valves are therefore urged upwardly, assuring that ducts 50, 52 and 60 will be in communication with each other and that ducts 63, 65 and 71 communicate with each other. Accordingly, the governor 75 has no controlling effect at this time. The elements of servo actuators 59 and 89 are so constructed and arranged that, as illustrated, the movable members of servo valves 53 and 70 are ineffective to prevent full fluid flow between ducts 52 and 60, on the one hand, and 65 and 71, on the other hand.

As the working circuit of torque converter 1 is filled to a desired extent, members 25 and 26 of valve 9 reach the intermediate positions shown, so that the tapered nose portions 31 and 34 cooperate with grooves 30 and 33, respectively, to allow a finely regulated flow of fluid through the working chamber of torque converter 1. At this point, governor 75 can be brought into effective action by moving lever 138 to its extreme left hand position, placing conduit 131 in communication with exhaust line 135, port 132 being blocked, so that fluid pressure is removed from below the lower movable member of pilot valve 51. The fluid pressure applied to the upper end of the upper movable member of pilot valve 51 via duct 52 and branch 54 now overcomes the biasing action of spring 55, so that the movable members of pilot valve 51 are forced downwardly, placing duct 50 in communication with duct 56. At this point, it is to be remembered that upward movement of movable member 58 of servo valve 53 can place duct 56 in communication with duct 61 and thus with chamber 94, the latter being at atmospheric pressure, while downward movement of member 58 of servo valve 53 can place duct 56 in communication with duct 60 and therefore with pressure line 117.

Since the speed with which shaft 4 is driven is dependent on the amount of fluid in the working chamber of torque converter 1, it is also dependent upon the positions of the movable members 25, 26 of valve 9, and therefore upon the effective differential between the constant pressure beneath piston 29 and the variable control pressure above piston 29. With governor 75 now in effective action, this pressure differential is regulated by operation of the governor in order to maintain the speed of shaft 4 substantially constant. Thus, an increase in the speed of shaft 4 above the desired value increases the speed of centrifugal actuator 91, raising member 79 of valve 76 to place the interior of cylinder 81 below piston 84 in communication with exhaust duct 83 so that spring 85 moves piston 84 downwardly. Such downward motion of the governor piston, acting through linkage 87, causes lever arm 99 of servo actuator 59 to pivot in a direction raising servo valve member 58 to place duct 56 in communication with exhaust duct 61. Fluid accordingly escapes from cylinder 28 above piston 29 and piston 29 is moved upwardly, so that members 25, 26 of valve 9 are adjusted to allow less fluid to flow to converter 1 via line 5 and more fluid to escape from the converter via line 6. The amount of fluid in the working circuit of converter 1 is thus decreased, so that the speed with which the converter drives shaft 4 decreases. Centrifugal actuator 91 slows, and valve member 79 returns to a position preventing movement of governor piston 84 as the speed error is corrected.

A decrease in the speed of shaft 4 below the desired value results in downward movement of valve member 79, so that sufficient pressure is applied below governor piston 84, via ducts 82 and 80, to overcome the action of spring 85 and force piston 84 upwardly. Such movement of the governor piston causes linkage 87 to pivot lever arm 99 in a direction to lower servo valve member 58, so that fluid under pressure is supplied above piston 29 via conduit 117 and ducts 60, 56 and 50. Piston 29 is accordingly forced downwardly, adjusting members 25, 26 of valve 9 to increase the flow of fluid to torque converter 1 via line 5 and decrease the discharge of fluid therefrom via line 6. Since the amount of fluid in the working circuit of the torque converter is thus increased, the speed with which the converter drives shaft 4 increases, governor 75 acting to terminate the correction when the desired shaft speed is again attained.

It will be understood that the movements imparted to servo valve member 58 by the action of the governor are small and that the apparatus is effective to allow little actual speed variation of the driven shaft. It will also be understood by those skilled in the art that the governor is activated manually, through valve 129, only when the engine speed is in a range suitable for governor control and that, under other conditions, the system is operated with the converter full and under pressure, the output shaft speed then depending substantially entirely upon the engine speed.

By moving lever 128 of valve 115 to the extreme right hand position, converter 1 is dumped and converter 2 filled in the same manner just described with reference to control of converter 1, and valve 129 can again be actuated to cause governor 75 to control the speed with which shaft 4 is driven in a forward direction by converter 2.

When it is desired to stop shaft 4, lever 128 of valve 115 is moved to its intermediate position, causing conduits 117 and 119 both to be placed in communication with exhaust conduit 124, pressure supply port 120 being blocked. Since the fluid above both piston 29 and piston 49 is now discharged, the movable members of both valves 9 and 10 assume extreme upper positions, and both converter 1 and converter 2 are dumped.

What is claimed is:

1. A control system for a torque converter having a chamber defining a working circuit provided with an inlet and an outlet; fluid supply circuit means adapted to be connected to said inlet for supplying fluid under pressure to said chamber; fluid discharge circuit means adapted to be connected to said outlet for removal of fluid from said chamber; valve means comprising two movable valve members each operatively disposed in a different one of said circuit means to control fluid flow therein, said valve members being movable between open and closed positions via intermediate flow regulating positions; valve actuating means operatively connected to said valve members to move the same oppositely, whereby one of said members is opened as the other is closed; power means comprising a cylinder and a piston disposed for reciprocation in said cylinder, said piston being connected to said actuating means to operate the same for movement of said valve members; means connected to said cylinder to supply fluid under pressure on one side of said piston; a pilot valve; a servo valve; fluid flow means communicating with said cylinder on the other side of said piston; a control valve operatively arranged to connect said fluid flow means selectively to a source of fluid under pressure and to exhaust, said fluid flow means including a first fluid conducting portion bypassing said servo valve and a second fluid conducting portion controlled by said servo valve, said pilot valve being operatively arranged to select said first portion when said pilot valve is in one position and said second portion when said pilot valve is in another position; means connected to said pilot valve to actuate the same selectively to said positions; and means connected to said servo valve and responsive to a variable condition of said torque converter to control said servo valve in accordance with said condition, said servo valve being operative selectively to (1) complete said fluid flow means, via said second fluid conducting portion, and (2) connect said second fluid conducting portion to exhaust independently of said control valve.

2. A control system in accordance with claim 1 wherein said control valve is manually actuated, and
said last named means comprises a manually operated selector valve for selectively rendering said last named means effective to control said servo valve.

3. A control system in accordance with claim 1 wherein said last named means is a speed responsive governor.

4. In a hydraulic power transmission, the combination of a rotary driving shaft;
a rotary driven shaft;
first and second hydraulic torque converters each connected between said shafts,
one of said torque converters being arranged to transmit power to said driven shaft in the same direction as a given direction of rotation of said driving shaft, and
the other of said torque converters being arranged to transmit power to said driven shaft in an opposite direction from the said given direction of rotation of said driving shaft to reverse the direction of rotation of the driven shaft
each of said torque converters having a hydraulic working circuit provided with an inlet and an outlet;
a first fluid supply circuit and a first fluid discharge circuit connected respectively to the inlet and outlet of one of said torque converters;
a second fluid supply circuit and a second fluid discharge circuit connected respectively to the inlet and outlet of the other of said torque converters;
first valve means including two movable valve members each operatively disposed in a different one of said first fluid circuits;
second valve means including two movable valve members each operatively disposed in a different one of said second fluid circuits,
said valve members each being movable between fully open and fully closed positions via intermediate flow regulating positions in which each of said valve members is partially open to meter fluid to and from said torque converters,
said first and second valve means each being provided with pressure operated actuating means;
a pressure source for supplying pressure to each of said actuating means;
first control means to select the direction of rotation of said driven shaft,
said first control means being connected between said pressure source and said actuating means;
    to operate one of said valve means so that its associated inlet circuit is open and outlet circuit is closed to supply operating fluid to one of said torque converters, and
    to simultaneously operate the other of said valve means so that its associated inlet circuit is closed and outlet circuit is open to drain operating fluid from the other of said torque converters,
the one of said torque converts to which fluid is supplied then being a driving torque converter to drive said driven shaft, and
second control means for controlling the speed of rotation of said driven shaft,
said second control means being operably connected between said pressure source and said actuating means to operate said actuating means to move the one of said valve means associated with the driving torque converter toward one of said intermediate flow regulating positions and to maintain the valve in said intermediate flow regulating position to regulate the amount of operating fluid in said driving torque converter and correspondingly the speed of rotation of said driven shaft, without changing the position of the valve means associated with the other torque converter.

5. A hydraulic power transmission in accordance with claim 4 and wherein:
said second control means comprises:
a governor operative in response to the speed of said driven shaft,
a pair of servo control valves operated by said governor, and
a selector valve for selectively rendering said servo control devices operative to control said actuating means.

6. A hydraulic power transmission in accordance with claim 4 in which:
each of said actuating means comprises:
a cylinder, and
a piston arranged for reciprocation in said cylinder;
each of said pistons being connected to a different one of said valve means to move one of said valve means independently of the other.

References Cited in the file of this patent

UNITED STATES PATENTS

| | | |
|---|---|---|
| 948,725 | Freeman | Feb. 8, 1910 |
| 1,987,985 | Bauer et al. | Jan. 15, 1935 |
| 2,018,616 | Martyrer et al. | Oct. 22, 1935 |
| 2,024,842 | Bauer et al. | Dec. 17, 1935 |
| 2,095,820 | Lenz | Oct. 12, 1937 |
| 2,153,381 | Maas | Apr. 4, 1939 |
| 2,291,011 | Vickers | July 28, 1942 |
| 2,341,624 | Kieser | Feb. 15, 1944 |
| 2,373,621 | Wales | Apr. 10, 1945 |
| 2,416,948 | Pavlecka | Mar. 4, 1947 |
| 2,436,034 | Buehler | Feb. 17, 1948 |
| 2,805,549 | Hensleigh et al. | Sept. 10, 1957 |